United States Patent [19]

Sugimoto et al.

[11] Patent Number: 4,856,656
[45] Date of Patent: Aug. 15, 1989

[54] MULTI-LAYER FILM AND PACKAGE

[75] Inventors: Keiji Sugimoto; Takeo Hayashi; Masahiro Fujimoto, all of Chiba, Japan

[73] Assignee: Idemitsu Petrochemical Co., Ltd., Tokyo, Japan

[21] Appl. No.: 169,101

[22] Filed: Mar. 9, 1988

Related U.S. Application Data

[63] Continuation of Ser. No. 20,708, Mar. 2, 1987.

[30] Foreign Application Priority Data

Mar. 17, 1986 [JP] Japan .................................. 61-57070
Dec. 25, 1986 [JP] Japan .................................. 61-307805

[51] Int. Cl.⁴ .............................................. B65D 81/02
[52] U.S. Cl. ................................... 206/523; 428/349; 428/35.2; 428/35.7; 206/484
[58] Field of Search ................. 428/349, 516, 35; 206/484, 523, 586; 229/3

[56] References Cited

U.S. PATENT DOCUMENTS

| | | | |
|---|---|---|---|
| 3,547,754 | 12/1970 | Tokos et al. | 428/516 X |
| 3,695,421 | 10/1972 | Wood | 206/586 |
| 3,817,821 | 6/1974 | Gallini | 206/484 |
| 3,980,735 | 9/1976 | Kosaka et al. | 428/461 |
| 4,252,846 | 2/1981 | Romesberg et al. | 206/484 |
| 4,288,490 | 9/1981 | Alfter et al. | |
| 4,291,082 | 9/1981 | Stall | 428/516 X |
| 4,533,578 | 8/1985 | Body et al. | |
| 4,546,882 | 10/1985 | Hsu et al. | 206/484 |
| 4,547,811 | 4/1987 | Boyd et al. | 428/516 X |
| 4,565,720 | 1/1986 | Yaeo et al. | 428/516 X |
| 4,657,982 | 4/1987 | Breck et al. | 524/490 |
| 4,661,401 | 4/1987 | Akao | 428/516 X |
| 4,700,838 | 10/1987 | Falciani et al. | 206/484 |
| 4,759,446 | 7/1988 | Dobashi et al. | 206/586 |

FOREIGN PATENT DOCUMENTS 2388659 11/1978 France .

OTHER PUBLICATIONS

"The Plastics Manual" Apr. 24, 1967, pp. 56-57 *Polyethylene* published by Applied Plastics.
"Plastics" Jun. 16, 1966, p. 59, *Ethylene-Vinyl Acetate* Joseph F. Pilaro.

*Primary Examiner*—David T. Fidei
*Attorney, Agent, or Firm*—Frishauf, Holtz, Goodman & Woodward

[57] ABSTRACT

The first invention provides a multi-layer film comprising (A) a low density polyethylene-based resin layer, (B) a polyolefin-based resin expanded layer and (C) a high density polyethylene-based resin layer.

The second invention provides a package comprising (I) an article to be packaged, (II) the multi-layer film of the first invention, said multi-layer film being used in packaging the article in such a manner that the low density polyethylene-based resin layer is in contact with the article, and (III) a buffering material being used to fix the article.

The multi-layer film of the first invention is excellent in buffering properties, tensile strength, tear strength, impact strength and stiffness, and further has good frictional charcteristics and good pearl-like appearance.

With the package of the second invention, an article can be efficiently protected during its storage and transportation, and thus an easily scratchable article can be effectively protected.

14 Claims, 1 Drawing Sheet

MULTI-LAYER FILM AND PACKAGE

This application is a continuation of application Ser. No. 020,708 filed Mar. 2, 1987.

The present invention relates to a multi-layer film and a package.

As a multi-layer film, a low density polyethylene shrinkable film which is produced by the multi-layer coextrusion method and in which a polyethylene layer having a thickness corresponding to 10 to 90% by weight of the film is expanded to 1.5 to 5 times the original volume is known as described in Japanese Patent Application Laid-Open No. 20345/1982.

The above film is suitable for shrink packaging, but has disadvantages in that the strength and stiffness are low. Furthermore, the frictional characteristics of the film surface are not sufficiently satisfactory. Thus the film has not been able to find applications other than shrink packaging; that is, it is limited in its use. Moreover the film has a problem that when used in packaging of articles such as appliances, television sets, and audio sets, it cannot sufficiently protect the articles.

Articles such as appliances, television sets and audio sets, and other articles such as business instruments, precision instruments and furniture have heretofore been packed in a packaging case such as a resin expanded material, a cardboard and a wooden case in order to protect them against scratching or breakage during the storage or transportation thereof. In this case, in order to protect the articles against humidity or to prevent the attachment of stains derived from rubbish or dust, the article is previously packed with, for example, a low density polyethylene film and, thereafter, it is fixed with, for example, a card board case, a wooden case and a band through a buffer material such as a foamed plastic and a card board.

The above method, however, has a problem in that the product value is reduced by scratching of the surface and peeling apart of the paint or plated layer due to the friction between the packaging film and the article at the time of the transportation and handing of the article although, at the beginning, it can protect the article against humidity and prevent the attachment of dust and so on. In order to overcome the above problem, (1) a method in which an article is packed with a heat-shrinkable film, which is then shrinked by heating, and thereafter the article is placed in an outer case through a buffering material and (2) a method in which a multi-layer sheet produced by laminating an expanded polyolefin sheet and a high density polyethylene film is used have been proposed and have now been put into practical use. The former method (1), however, has disadvantages in that not only a heat-shrinkable film but also a heat tunnel for shrinkage are edged and thus the equipment, equipment space and amount in the total packaging cost.

The latter method (2) also has disadvantages in that the production cost of the multi-layer film is increased by the lamination step and the sheet thickness, the thickness of the expanded sheet is usually 500 to 600 microns and becomes bulky in the production, storage and transportation of the multi-layer sheet, and accordingly the total packaging cost is increased unsatisfactorily particularly in these years where the international trading is increased. Thus it has been desired to overcome the above problems.

As a result of extensive investigations to overcome the above prior art problems, it has been found that an package which is effective in protecting an article, has a sufficiently high strength even if the thickness is small, is excellent in appearance and is inexpensive can be obtained using the multi-layer film of the first invention and buffering material. Based on these findings, the second invention has been completed.

SUMMARY OF THE INVENTION

An object of the first invention is to provide a multi-layer film which is free from the above problems, is excellent in strength and stiffness, has good surface printing properties, has such good appearance that the surface has good pearl-like appearance and feels like Japanese paper, and further which can be used as, for example a bag, a hanging bag, a book cover or a table cloth.

An object of the second invention is to provide the package which is effective in protecting an article, has a sufficiently high strength even if the thickness is small, is excellent in appearance and is inexpensive.

That is, the first invention provides a multi-layer film comprising (A) a low density polyethylene-based resin layer, (B) a polyolefin-based resin expanded layer and (C) a high density polyethylene-based resin layer.

The second invention provides a package comprising (I) an article to be packaged, (II) a multi-layer film comprising (A) a low density polyethylene-based resin layer, (B) a polyolefin-based resin expanded layer and (C) a high density polyethylene-based resin layer packaged on the article, said multi-layer film being used in packaging the article in such a manner that the low density polyethylene-based resin layer is in contact with the article, and (III) a buffering material being used to fix the article.

BRIEF DESCRIPTION OF THE DRAWINGS

The FIGURE is a perspective view illustrating an embodiment of the package of the present invention.

The reference numerals represent 1 . . . Package, 2 . . . Multi-layer film, 3 . . . Article to be packaged, 4 . . . Buffering material, 5 . . . Outer case

DETAILED DESCRIPTION OF THE PREFERRED EMBODIMENTS

Figure 1:
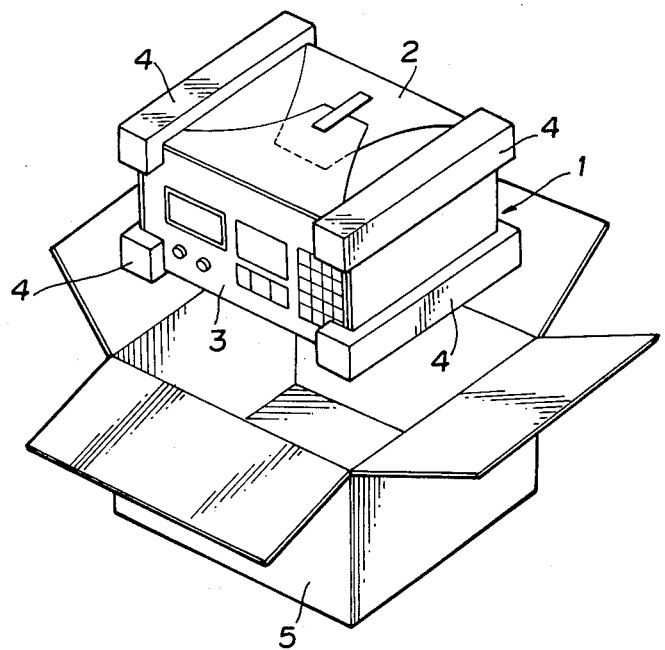

In the present invention, a multi-layer film which comprises (A) a low density polyethylene-based resin layer, (B) a polyolefin-based resin expanded layer and (C) a high density polyethylene-based resin layer, in which the outer and inner surfaces are different in physical properties such as a coefficient of friction, and which includes an intermediate expanded layer.

As the low density polyethylene-based resin to form the layer (A), a resin having a density of 0.900 to 0.940 g/cm$^3$, preferably 0.905 to 0.935 g/cm$^3$ and particularly preferably 0.910 to 0.930 g/cm$^3$, and a melt index (MI) of 0.1 to 50 g/10 min, preferably 0.2 to 30 g/10 min, and particularly preferably 0.3 to 20 g/10 min is used. Low density polyethylene-based resins which can be used include high pressure low density polyethylene (LDPE), copolymers of ethylene and α-olefins having 3 to 12 carbon atoms, such as propylene, butene-1, 4-methylpentene-1 and octene-1 as produced by the moderate or low pressure process, so-called linear low density polyethylene (LLDPE), copolymers of ethylene and polar vinyl monomers, and so on, and their mixtures. Examples of the above polar vinyl monomers are vinyl acetate, acrylic acid, methacrylic acid, acrylic acid esters, methacrylic acid esters, and various metal salts of acrylic acids. Examples of the copolymers of ethylene and polar vinyl monomers are an ethylene-vinyl acetate copolymer, an ethylene-methyl acrylate or methyl methacrylate copolymer, an ethylene-ethyl acrylate or ethyl methacrylate copolymer, an ethylene-acrylic acid or methacrylic acid, and their partial metal salts (ionomers). Of these polymers, an ethylene-vinyl acetate copolymer, or mixtures of an ethylene-vinyl acetate copolymer and not more than 50% by weight of LDPE, LLDPE, ionomers and so on are particularly preferred to improve the frictional characteristics of both the layers of the multi-layer film. In connection with the ethylene-vinyl acetate copolymer (EVA), it is preferred to use an ethylene-vinyl acetate copolymer having a vinyl acetate content of 5 to 35% by weight, preferably 7 to 30% by weight, a density of 0.920 to 0.940 g/cm$^3$ and a melt index of 0.5 to 20 g/10 min. When the ethylene-vinyl acetate copolymer is used, easily scratchable articles such as transparent resin parts of audio sets can be sufficiently protected.

To the low density polyethylene-based resin can be compounded, if necessary, a low crystalline or noncrystalline ethylene-propylene copolymer having a density of 0.850 to 0.895 g/cm$^3$, an ethylene-butene-1 copolymer, a petroleum resin, or a terpene-phenol resin in an amount of not more than 30% by weight.

The low density polyethylene-based resin layer imparts anti-slipperiness and flexibility to the multi-layer film. That is, when the multi-layer film is used as a table cloth or a wrapping bag, the low density polyethylene-based resin layer prevents sliding and facilitates its use and handling. When the multi-layer film is used in packaging of appliances and so forth, the low density polyethylene-based resin layer is used in such a manner as to be in contact with an article to be packaged and plays an important role in protecting the article to be packaged. Furthermore, the low density polyethylene-based resin layer accelerates expansion of the intermediate layer and improves film moldability, particularly inflation film moldability. The coefficient of static friction of the low density polyethylene-based resin layer surface is usually not less than 0.4, preferably not less than 0.5 and more preferably not less than 0.6. The above coefficient of static friction indicates a coefficient of static friction between low density polyethylene-based resin layer surfaces (measured according to ASTM D-1894).

The layer (B), i.e., the intermediate layer of the multi-layer film is a polyolefin-based resin expanded layer. As the polyolefin resin, as well as polyethylene-based resins such as high density polyethylene (HDPE), low density polyethylene (LDPE), linear low density polyethylene (LLDPE), copolymer of ethylene and polar vinyl monomer and copolymer of ethylene and unsaturated carboxylic acid, polypropylene, polybutene and copolymers of α-olefins and other α-olefins, and their mixtures can be used. Of these polymers, as the polyolefin-based resin, a polyethylene-based resin is preferred, and low density polyethylene and linear low density polyethylene are particularly preferred. The above linear low density polyethylene includes copolymers of ethylene and α-olefins having 3 to 12 carbon atoms, such as propylene, butene-1, 4-methylpentene-1 and octene-1. For the low density polyethylene and the linear low density polyethylene, the density is 0.900 to 0.940 g/cm$^3$ and preferably 0.910 to 0.930 g/cm$^3$, and melt index (MI) is 0.1 to 50 g/10 min and preferably 0.2 to 20 g/10 min. To these polyolefin-based resins can be compounded not more than 50% by weight of an elastomer or other resins. If necessary, not more than 50% by weight of an inorganic filler, such as calcium carbonate, talc, clay, kaolin, titanium oxide and zeolite can be compounded.

Foaming agents which can be used in expanding the above polyolefin-based resin expanded layer can be divided into two groups, chemical foaming agents and physical foaming agents, depending on the mechanism of expansion. Examples of such chemical foaming agents are azodicarbonamide, metal salts of azodicarbonamide, hydrazodicarbonamide, p-toluenesulfonylhydrazide, dinitropentamethylenetetramine and azobisisobutyronitrile. Examples of the physical foaming agents are butane, heptane, hexane, dichlorodifluoromethane, nitrogen, and carbon dioxide gas.

In the polyolefin-based resin expanded layer, the compounding ratio of the polyolefin-based resin as the feed resin to the foaming agent is not critical and varies with the type of the foaming agent and so forth. It suffices that the compounding ratio is determined so that the expansion ratio is 1.2 to 5 times and usually 1.5 to 3 times. For the polyolefin-based resin expanded layer, it is preferred that the diameter of cell be small. To the polyolefin-based resin expanded layer, if necessary, inorganic fine powder and metal salts of higher fatty acids can be appropriately added as cell nucleating agents. Examples of the higher fatty acid metal salts are sodium stearate, calcium stearate and magnesium stearate. Expansion can be uniformly accomplished by adding the nucleating agent in an amount of 0.03 to 1% by weight.

The polyolefin-based resin expanded layer has not only an action of making the multi-layer film opaque so that it gets a pearl-like appearance, but also an action of imparting buffering properties to the multi-layer film.

As the high density polyethylene-based resin to form the layer (C), a resin having a density of 0.945 to 0.975 g/cm$^3$, preferably 0.947 to 0.970 g/cm$^3$ and MI of 0.01 to 5 g/10 min, preferably 0.02 to 2 g/10 min. High density polyethylene-based resins which can be used include ethylene homopolymers and copolymers of ethylene and other α-olefins such as propylene and butene-1. To the high density polyethylene-based resin, low density polyethylene and low crystalline or noncrystalline ethylene-propylene copolymer or ethylene-butene-1 copolymer having a density of 0.850 to 0.895 g/cm$^3$ can be added in an amount of 50% by weight or less within the range that the slipperiness of the present invention is not deteriorated.

The high density polyethylene-based resin layer imparts slipperiness, strength and stiffness to the multi-layer film and when the multi-layer is used as a bag, improves the opening properties of the bag and makes it easy to taken out or put in an article in the multi-layer film. In enclosing the article, the multi-layer film is used in such a manner that the high density polyethylene-based resin layer is exposed outside. Thus, when the packaged article is vibrated, the vibration is absorbed by the sliding between the film outer surface and the buffering material. Thus the high density polyethylene-based resin layer prevents the article from being directly rubbed by the buffering material and acts to protect the article. Accordingly the coefficient of static friction of the high density polyethylene-based resin layer is usually not more than 0.35 and preferably not more than 0.3. Furthermore the high density polyethylene-based resin layer accelerates the expansion of the intermediate layer and improves the moldability of the multi-layer film.

It may be considered that in place of the high density polyethylene-based resin, an intermediate or low density polyethylene with a slipping agent added is used. In fact, however, the slipping agent transfers into the intermediate expanded layer and thus an easily sliding surface cannot be obtained. To each resin layer of the multi-layer film of the present invention, if necessary, various additives such as a thermal stability, an ultraviolet absorber, an antistatic agent, an flame retardant, an antirust agent and a coloring agent can be added.

The multi-layer film of the first invention is composed of three layers as described above. The thickness of the multi-layer film is usually 30 to 300μ and particularly preferably 40 to 200μ. In connection with the layer thickness ratio, the layer (A):the layer (B):the layer (C)=5 to 60: 10 to 90:5 to 70 and particularly preferably 10 to 40:20 to 80:10 to 50. In this case, since the thickness of the expanded layer is difficult to measure, the layer thickness ratio is determined based on the weight ratio of feed resins used prior to the expansion of the intermediate layer.

The multi-layer film of the present invention can be produced by, for example, blown film co-extrusion or T-die coextrusion. In the case of blown film co-extrusion, the above feed resins are sufficiently melt kneaded in the respective extruders and then coextruded by the use of in-die or a out-die adhesion type circular die in such a manner that the low density polyethylene-based resin layer becomes an outer layer to produce a coextruded tubular film. This coextruded tubular film can be slit to produce a flat film. In this case, the die temperature is usually 130° to 180° C., the die lip clearance is 0.5 to 2.0 mm and the blow ratio is 1.5 to 5.0. This blown film coextrusion is particularly preferred for the production of the multi-layer film of the present invention in that since the foaming agent-containing resin layer is completed covered by the resin layers(A) and (C), expansion is satisfactorily achieved, problems such as deposits which is produced by decomposition product of foaming agents to die do not occur, and thus the multi-layer film can be produced in a stabilized manner for a long time.

In the case of the T-die coextrusion, it is preferred to use a surrounding type die with which the polyolefin-based resin expanded layer as the intermediate layer is surrounded with the layers (A) and (C). The thus-produced multi-layer film is, if necessary after printing or engraving with an embossing roll, fabricated into a flat bag or a square bottomed bag. Alternatively it is cut or melt-fused to produce products such as a table cloth and a book cover.

The Package of the present invention is produced using the above multi-layer film of the first invention, and packs an article to be enclosed in such a manner that the low density polyethylene-based resin layer of the multi-layer film faces inside and fixed with a buffering material.

There are no special limitation to the type of the article to be packaged. Articles particularly preferred to be packaged with the multi-layer film are appliances, television sets, audio sets, business instruments, precision instruments, furniture and so forth which are desired to be protected against scratching and breakage. In enclosing the article, it suffices that the as the multi-layer film, a bag-shaped film is used, or the article is packaged with a flat film.

Buffering materials to be used in fixing after the enclosing include resin expanded materials such as expanded polystyrene and expanded polyolefin, card board and so forth.

FIG. 1 is a perspective view of the packages of the second invention.

The packages 1 of the second invention comprises the multi-layer film 2, the article 3 to be packaged and a buffering material 4 which is used to fix the article. The package 1 may be placed in an outer case 5 such as a card board box, or fixed with a wooden case or an adhesive tape, for example.

The multi-layer film of the present invention is excellent in buffering properties, tensile strength, tear strength, impact strength and stiffness, and further has good frictional characteristics and printing properties. Thus the thickness of the multi-layer film can be decreased. This leads to a reduction in packaging cost and also to energy and resources saving.

The multi-layer film of the first invention has a high expansion efficiency because the expanded resin layer is included as an intermediate layer, and furthermore has advantages that the formation of deposits derived from the foaming agent and additives can be reduced, and thus the continuous production of the multi-layer film can be performed continuously for a long time and the production costs can be decreased.

The multi-layer film of the first invention has a beautiful appearance that the appearance is pearl-like, and that provides Japanese paper feeling. Thus the multi-layer film of the first invention can be utilized in various applications such as a mat, a table cloth, a book cover, a bag and a shopping bag.

With the package of the second invention, an article can be efficiently protected during its storage and transportation, and thus an easily scratchable article can be effectively protected.

In the package of the second invention, since a layer having a greater coefficient of static friction than the layer (C) is used as the layer (A), the article to be packaged less slips over the packaging film while on the other hand the buffering material easily slips over the packaging film. Accordingly the article to be packaged which is usually made of hard material is not rubbed with the packaging film; rather, the packaging film and the article to be packaged are fixed and the buffering material which is made of very soft material easily slips over the packaging film. Therefore there is no danger of the film being damaged. The scratching of the article to be packaged and the peeling apart of the paint due to the friction between the film and the article to be packaged can be prevented. Accordingly the article to be packaged In the packages of the second invention, the thickness of the multi-layer film used can be decreased. Even with a thin multi-layer film having a thickness of 50 to 100μ, sufficiently high strength and protection performance can be obtained even as compared with the conventional multi-layer expanded laminate sheet having a thickness of about 500μ. Accordingly the workability is steadily increased, the film is not bulky at the time of storage and transportation, the total packaging cost can be decreased, and the natural resources can be saved.

Furthermore a special apparatus required for the conventional shrink packaging is not needed, and the packaging operation can be greatly simplified.

The multi-layer film used in the second invention has good printing properties, and its appearance has pearl-like luster and provides a Japanese paper feeling. Thus it can be used as a beautiful package.

The multi-layer film in the packages of the second invention can be easily obtained in any desired size and is not limited by the size and shape of the article.

Accordingly the packages of the second invention can be effectively utilized as a packages for various articles such as appliances television sets, audio sets, business instruments, precision instruments, furniture and so forth.

The present invention is described in greater detail with reference to the following examples although it is not intended to be limited thereto.

EXAMPLES 1 TO 6

Resins shown in Table 1 were melt kneaded with three extruders, introduced in an in-die adhesion type circular die and performed the blown film co-extrusion at a blow ratio of 3 to produce a three layer tubular film in which the intermediate layer (B) was expanded. In the intermediate layer (B), 4 parts by weight of an azodicarbonamide-based foaming agent master batch was added. The ratio in thickness of the layers in the film was calculated from the weights of the resins used under the condition that the intermediate layer (B) was in an unexpanded state, and is shown in Table 1. The film thickness calculated in the same manner as above provided that the intermediate layer (B) was in an unexpanded state was 60μ. In the intermediate expanded layer of the above obtained multi-layer film, the expansion ratio was 1.8–2.2 and the total thickness was about 80μ. Physical properties of the film are shown in Table 1. The thus-produced film was fabricated into a shopping bag. This bag had good opening properties.

The above film was cut and opened. Using this film, an audio set (with a transparent polycarbonate plate) was enclosed in such a manner that the low density polyethylene layer as the outer layer (A) was in contact with the audio set. The audio set was fixed with a buffer material and placed in a cardboard box, and then vibrated with a vibration testing machine (F-800 manufactured by Shin Nippon Sokki Co., Ltd.) for 15 minutes under vibration conditions of 30 Hz and 7 G. Then, scratches formed in the transparent polycarbonate plate were examined and rated as follows.

⊙ : No scratch was formed.
○ : Almost no scratch was formed.
△ : Many scratches in a dot form were formed.
X : Many scratches in a big dot form were formed.

The results of the above vibration test are shown in Table 1.

COMPARATIVE EXAMPLE 1

The procedure of Example 1 was repeated with the exception that a low density polyethylene resin with a slipping agent incorporated therein was used as the inner layer resin.

The results are shown in Table 1.

COMPARATIVE EXAMPLE 2

The procedure of Example 1 was repeated with the exception that no expanding agent was incorporated in the intermediate layer.

The results are shown in Table 1.

REFERENCE EXAMPLE

A commercially available laminate film (a laminate film consisting of a 500μ thick low density polyethylene expanded film and a 13μ thick high density polyethylene) was measured for physical properties and was subjected to the same vibration test as above.

The results are shown in Table 1.

TABLE 1

|  | Type of Layer | Resins* Values in the Parentheses indicate Mixing Ratios | Layer Ratio (Starting Material) | Coefficient of Static Friction | |
|---|---|---|---|---|---|
|  |  |  |  | Inner Layer/ Inner Layer | Outer Layer/ Outer Layer |
| Example 1 | Inner Layer | HDPE | 4 |  |  |
|  | Intermediate Layer | LDPE-A | 4 | 0.25 | 2.1 |
|  | Outer Layer | EVA | 2 |  |  |
| Example 2 | Inner Layer | HDPE | 4 |  |  |
|  | Intermediate Layer | LDPE-A | 4 | 0.25 | 2.1 |
|  | Outer Layer | EVA(80). LDPE(20) | 2 |  |  |
| Example 3 | Inner Layer | HDPE | 4 |  |  |
|  | Intermediate Layer | LLDPE-I | 4 | 0.25 | 2.0 |
|  | Outer Layer | EVA | 2 |  |  |
| Example 4 | Inner Layer | HDPE(80). LLDPE-I(20) | 4 |  |  |
|  | Intermediate Layer | LDPE-A | 4 | 0.25 | 1.6 |
|  | Outer Layer | EVA | 2 |  |  |
| Example 5 | Inner Layer | HDPE | 4 |  |  |
|  | Intermediate Layer | LDPE-A | 4 | 0.26 | 0.65 |
|  | Outer Layer | LDPE-B | 2 |  |  |
| Example 6 | Inner Layer | HDPE | 4 |  |  |
|  | Intermediate Layer | LDPE-A | 4 | 0.26 | 0.75 |
|  | Outer Layer | LLDPE-II | 2 |  |  |
| Comparative Example 1 | Inner Layer | LDPE-C | 2 |  |  |
|  | Intermediate Layer | LDPE-A | 5 | 0.83 | 0.72 |
|  | Outer Layer | LDPE-A | 3 |  |  |
| Comparative | Inner Layer | HDPE | 4 |  |  |
|  | Intermediate | LDPE-A | 4 | 0.25 | 2.0 |

TABLE 1-continued

| | | | | | |
|---|---|---|---|---|---|
| Example 2 | Layer | | | | |
| | Outer Layer | EVA | 2 | | |
| Reference Example | Commercially Avairable Film | | | 0.80 | 0.20 |

| | Loat at Tensile Break [MD/TD] kg/cm | Elemendorf Tear Strength [MD/TD] g | Film Impact Strength kg · cm | Vibration Test |
|---|---|---|---|---|
| Example 1 | 1.9/1.5 | 100/360 | 8.5 | ◉ |
| Example 2 | 1.8/1.2 | 80/350 | 7.0 | ○ |
| Example 3 | 2.0/1.8 | 110/390 | 7.3 | ◉ |
| Example 4 | 1.6/1.3 | 76/330 | 9.4 | ◉ |
| Example 5 | 1.6/1.1 | 75/600 | 7.6 | △ |
| Example 6 | 1.8/1.4 | 105/400 | 8.2 | ○ |
| Comparative Example 1 | 0.8/0.6 | 50/200 | 3.5 | X |
| Comparative Example 2 | 2.2/1.9 | 120/410 | 10.0 | X |
| Reference Example | 1.0/0.6 | 22/200 | 6.0 | ◉ |

*Type of Resin
HDPE: Idemitsu Polyethylene 640 UF (manufactured by Idemitsu Petrochemical Co., Ltd.; density: 0.950 g/cm$^3$; MI: 0.03 g/10 min)
LDPE-A: PETROSEN 205 (manufactured by Toyo Soda Kogyo Co., Ltd.; density: 0.924 g/cm$^3$; MI: 3 g/10 min)
LDPE-B: PETROSEN 175 (manufactured by Toyo Soda Kogyo Co., Ltd.; density: 0.921 g/cm$^3$; MI: 0.6 g/10 min)
LLDPE-I: MORETEC 0138 manufactured by Idemitsu Petrochemical Co., Ltd.; density: 0.920 g/cm$^3$; MI: 1 g/10 min)
LLDPE-II: IDEMITSU POLYETHYLENE-L 0134L (manufactured by Idemitsu Petrochemical Co., Ltd.; density: 0.920 g/cm$^3$; MI: 1 g/10 min)
LDPE-C: LDPE-A with a slipping agent (2 wt % erucic acid amide) added.
EVA: ULTRASEN 540 (manufactured by Toyo Soda Kogyo Co., Ltd.; density: 0.927 g/cm$^3$; MI: 3 g/10 min; vinyl acetate content: 10 wt %)

What is claimed is:

1. A package for packaging an article such as appliances, television sets, audio sets, business instruments, precision instruments and furniture, said packages comprising
   a coetextruded multi-layer film comprising (A) an ethylene-vinyl acetate copolymer-based resin layer, (B) a polyethylene-based resin expanded layer of low density polyethylene with a density of 0.910 to 0.930 g/cm$^3$ and (C) a high density polyethylene-based resin layer, said multi-layer film being used in packaging the article in such a manner that the ethylene-vinyl acetate copolymer-based resin layer is in contact with the article; and a buffering material is used to fix the article.

2. The package as claimed in claim 1, wherein the ethylene-vinyl acetate-based resin has density of 0.900 to 0.940 g/cm$^3$ and a melt index of 0.1 to 50 g/10 min.

3. The package as claimed in claim 1, wherein the ethylene-vinyl acetate copolymer has a vinyl acetate content of 5 to 35% by weight, a density of 0.920 to 0.940 g/cm$^3$ and a melt index of 0.5 to 20 g/10 min.

4. The package as claimed in claim 1, wherein the low density polyethylene-based resin is a linear low density polyethylene.

5. The package as claimed in claim 1, wherein the high density polyethylene-based resin at has a density of 0.945 to 0.975 g/cm$^3$ and a melt index of 0.01 to 5 g/10 min.

6. The package as claimed in claim 1 wherein the ethylene-vinyl acetate copolymer-based resin further contains low density polyethylene or linear low density polyethylene or a mixture thereof present in an amount of up to 50%.

7. The package as claimed in claim 1 wherein the multi player film has a thickness of 30 to 300 microns.

8. The package as claimed in claim 5 wherein within the high-density polyethylene-based resin is an ethylene homopolymer; or a copolymer of ethylene and propylene or butene-1.

9. A film for use in packaging an article such as appliances, television sets, audio sets, business instruments, precision instruments and furniture, and which is a coextruded multi-layer film comprising (A) an ethylene-vinyl acetate copolymer-based resin layer, (B) a polyethylene-based resin expanded layer of low density polyethylene with a density of 0.910 to 0.0930 g/cm$^3$ and (C) a high density polyethylene-based resin layer, said multi-layer film being used in packaging the article in such a manner that the ethylene-vinyl acetate copolymer-based resin layer is in contact with the article.

10. The film as claimed in claim 9, wherein the ethylene-vinyl acetate-based resin has a density of 0.900 to 0.940 g/cm$^3$ and a melt index of 0.1 to 50 g/10 min.

11. The film as claimed in claim 9 wherein the ethylene-vinyl acetate copolymer-based resin further contains low density polyethylene or linear low density polyethylene or a mixture thereof present in an amount of up to 50%.

12. The film as claimed in claim 9 wherein the multilayer film has a thickness of 30 to 300 microns.

13. The film as claimed in claim 9 wherein the high density polyethylene-based resin has a density of 0.945 to 0.973 g/cm$^3$ and a melt index of 0.01 to 5 g/10 min.

14. The film as claimed in claim 13 wherein within the high-density polyethylene-based resin is an ethylene homopolymer; or a copolymer of ethylene and propylene or butene-1.

* * * * *